Figures 1, 2, 3:
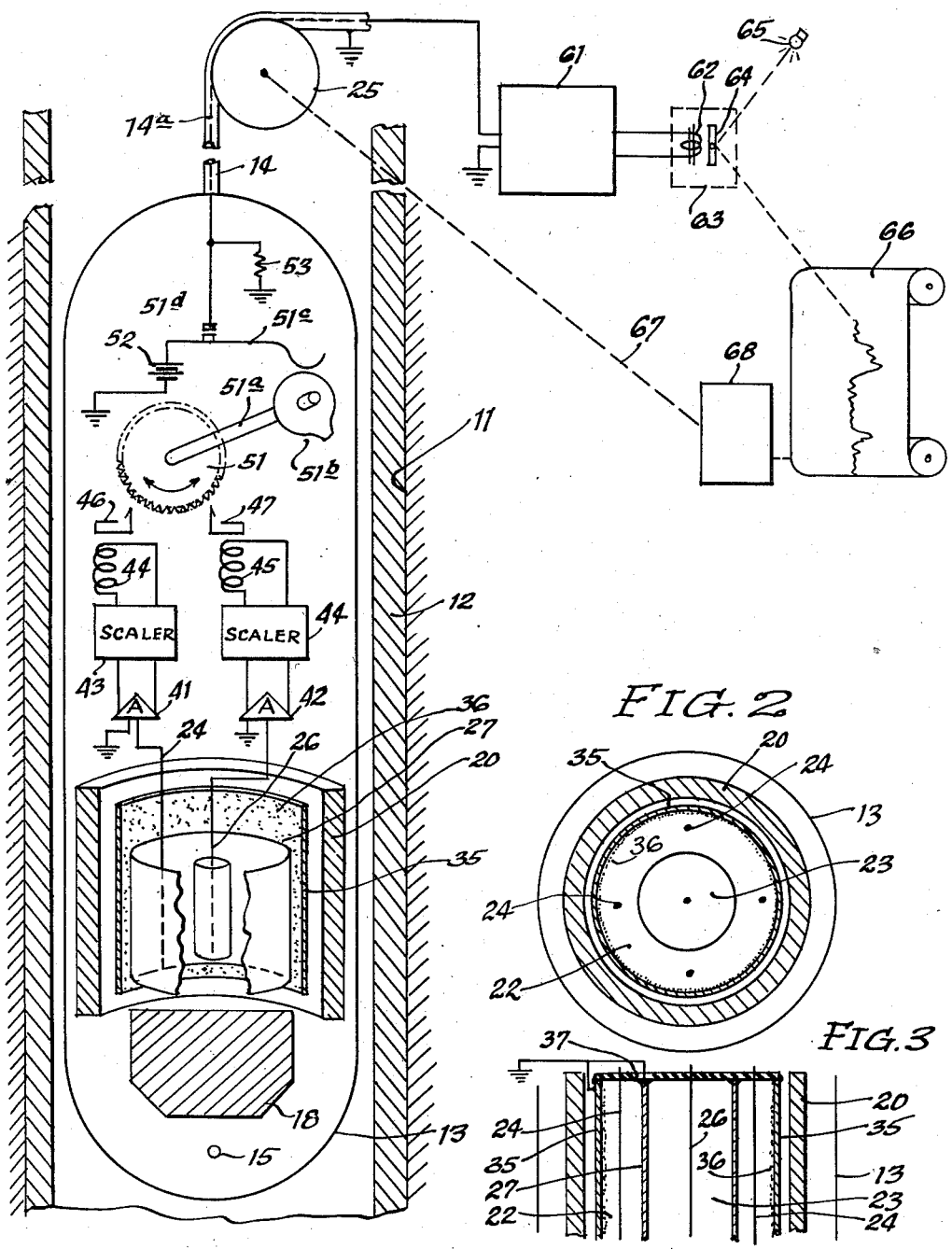

INVENTOR.
Serge A. Scherbatskoy

July 8, 1958 S. A. SCHERBATSKOY 2,842,675
RADIATION DETECTOR
Filed July 7, 1955 2 Sheets-Sheet 2

INVENTOR.
Serge A Scherbatskoy
BY Ooms, McDougall,
Williams & Hersh
Attorneys

United States Patent Office 2,842,675
Patented July 8, 1958

2,842,675
RADIATION DETECTOR
Serge A. Scherbatskoy, Tulsa, Okla.

Application July 7, 1955, Serial No. 520,567

5 Claims. (Cl. 250—83.6)

This invention relates to radiation detectors suitable for deep-well logging. In particular, it is addressed to a radiation detector particularly adapted for use in practicing the method of well logging in which the difference or ratio of the neutron-neutron and neutron-gamma ray responses are determined as a function of depth.

The aforesaid method of logging is particularly valuable in distinguishing between oil-containing rocks and subterranean strata containing connate water.

The method consists, broadly speaking, in irradiating the formations around a bore hole with neutrons derived from a suitable neutron source, such as a mixture of radium and beryllium, and simultaneously measuring the resulting returned neutrons and high-energy gamma rays of capture that are returned to the bore hole from the formations. The difference or ratio of the intensities of the two types of radiation is suitably plotted or recorded as a function of depth. The presence of any hydrogenous material, such as oil or water, in the surrounding formations will produce a decided decrease in the intensity of both types of radiation. The difference or ratio between the intensities will be substantially greater, however, when the hydrogenous material is water than when it is oil, due to the fact that the dissolved metal salts invariably found in connate water contain elements that absorb neutrons readily and, responsively to such absorption, radiate high-energy gamma rays.

The present invention provides a radiation detector particularly adapted for practicing the above-described process, in that it will yield a direct indication of the difference or ratio in intensity of the two types of radiation under consideration with minimum possibility of error as contrasted to apparatus available in the prior art for practicing the process.

Hence the major object of my invention is to provide a detector apparatus wherein the difference in response of two radiation detectors, or the ratio of their responses, is directly derived within the apparatus itself, such difference or ratio of response being indicated by an output signal some characteristic of which varies in accordance with changes in such difference or ratio.

Another object of the invention is to provide a radiation detector in which means are provided for deriving simultaneously two pulse trains, each of which is separately an indication of the intensity of a particular radiation field, said radiation detector comprising also means for deriving, directly from said pulses thereof, an output signal proportional to the difference or ratio in frequency of the respective pulse trains.

Still another object of my invention is to provide a radiation detector operative to develop two pulse trains, the frequency of each of which is respectively an indication of the intensity of a particular radiation field, and containing means whereby the pulses in such trains, suitably amplified, actuate a difference or ratio device, the frequency of output signal of such radiation detector being indicative of ratio or the difference between the frequencies of the two pulse trains.

A still further object of my invention is to provide a radiation detector capable of producing a reliable indication of the relative intensities of two radiation fields with a minimum of error introduced by instrument drift, temperature change, etc.

Still another object of my invention is to provide a well-logging instrument capable of producing an accurate indication of the difference or ratio of the intensity of two radiation fields despite changes in the absolute value of the intensities caused by variations in the chemical composition of the formations surrounding the bore hole at various depths.

Other objects and advantages of the present invention will appear from the detailed description thereof which follows.

Figure 4:
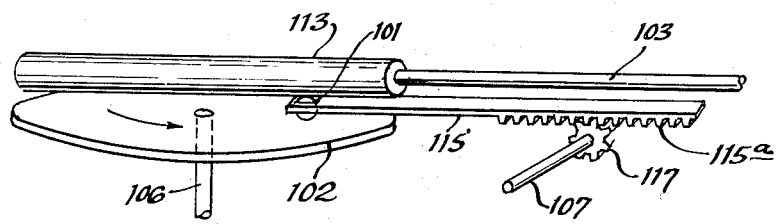
Figure 5:
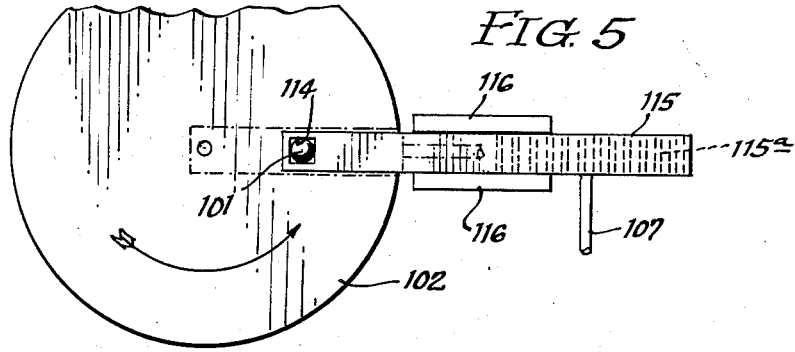
Figure 6:
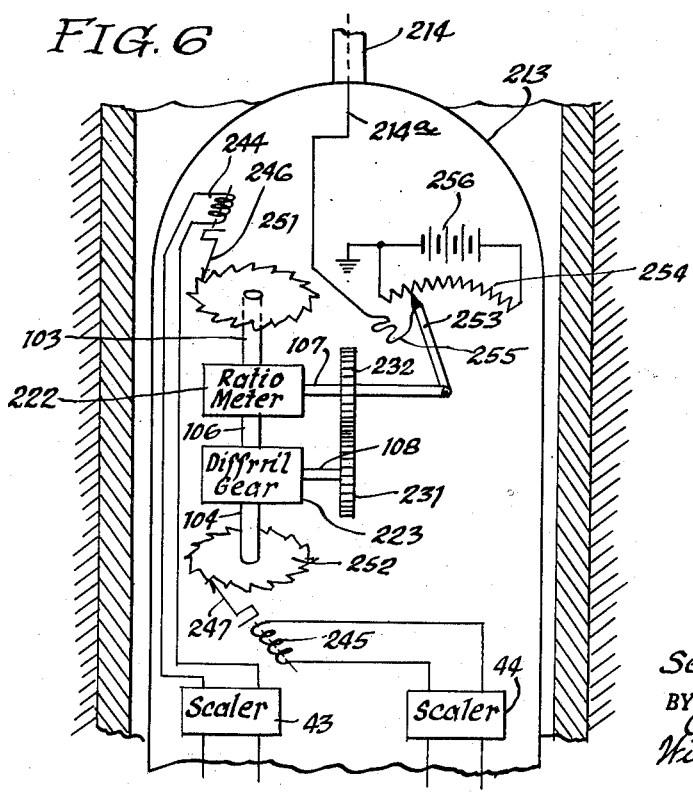

In the appended drawings, I have shown diagrammatically a typical embodiment of my invention, Figure 1 being a diagrammatic and schematic view of a radiation detector in accordance with the invention, for providing an output signal proportional to the difference in intensity of two radiation fields, Fig. 2 being a diagrammatic sectional view in the horizontal plane through the radiation detector of Fig. 1, showing the relative positions of the parts thereof, and Fig. 3 being a fragmentary sectional view in the vertical plane of the same apparatus. Fig. 4 is a fragmentary perspective view of a ratio meter which may form a part of my apparatus, Fig. 5 is a sectional view in the horizontal plane of part of the Fig. 4 apparatus, and Fig. 6 is a diagrammatic sketch showing how the Fig. 4 apparatus may be used in a radiation detector to provide an output signal that is proportional to the ratio of the intensity of two fields.

In Fig. 1 I have diagrammatically indicated a bore hole 11, provided with a conventional metal casing 12. The sub-surface portion of my apparatus is enclosed in a logging instrument 13 provided with a pressure-resisting housing and adapted to be raised and lowered within the bore hole on an armored cable 14 comprising an outer conducting armor or sheath and an inner conductor 14a.

It will be understood that the cable 14 may be as much as several thousand feet in length and will be payed out from or taken in on a conventional reel by means of a suitable arrangement including measuring wheel 25, the function of which is to provide a record at all times of the quantity of cable which has been lowered into the well. Such apparatus is conventional in all deep-well logging arrangements and will not be described in detail here. Incidentally, it will also be understood that my showing of a cable having only a single inner conductor is merely for convenience. If desired, a cable having a greater number of central conductors may be used, the other conductors serving conventional purposes such as transmitting electrical energy to the logging instrument 13 for operation of the amplifiers, etc. contained therein.

Mounted within the casing 13 at a point preferably near the lower end thereof I have provided a neutron source 15, which may consist of a capsule or ampule containing a mixture of radium and beryllium.

Above neutron source 15 and interposed between it and the radiation detectors about to be described, I have provided a shield 18, made of tungsten, lead, or other suitable material, to prevent direct neutron rays and gamma rays propagated by source 15 from affecting the radiation detectors mounted thereabove.

Above the shield 18, I have provided a radiation detector comprising a gamma-ray detector mounted coaxially within a neutron detector. The detector apparatus is surrounded on the outside by a cylindrical shield 20 which may be made of lead, tungsten, or other suitable material. If made of lead, the thickness will normally be between ¼ and ¾ inch. If made of tungsten, shield 20 may be thinner. Shield 20 may, if desired, be situated on the outside of the casing 13. This arrangement has the advantage that it displaces a part of the mud normally in the bore hole and thereby reduces the effect of such mud on the neutron and gamma-ray fields.

Coaxially mounted within shield 20 is a structure comprising a sealed enclosure defined by cylindrical member 35 and end seals 37 made of suitable air-tight insulating material such as the well-known, non-brittle substance commonly called "powdered glass" and often used in the envelopes of radio transmitting tubes. The upper seal 37 is shown in Fig. 3, and, it will be understood, a similar seal is provided at the lower end of cylindrical member 35.

Cylinder 35 is made of metal and is coated on its inner surface with a thin coating 36 of boron or a suitable compound thereof.

Mounted centrally within the sealed envelope is a second cylindrical metallic member, designated 27, the ends of which are sealed to the sealing elements 37 and which effectively divides the space within the sealed envelope into an outer annular space 22 and an inner space, cylindrical in shape, designated 23.

Suitably distributed within space 22 I have provided a plurality of axially disposed wires 24, all of which are electrically connected in parallel and which act as anodes for the neutron-detector portion of my apparatus. The outer cylindrical electrode 35, with its boron coating 36, acts as the cathode of the neutron detector, the cathode element 35 being held electrically by ground potential and the anode wires 24 being connected to amplifier-power supply unit 41 which impresses a high positive voltage on the anode wires 24. The space 22 is filled with boron trifluoride or other suitable gas. Hence space 22, cathode 35, anode wires 24, and amplifier-power supply unit 41 collectively act as a detector of slow neutrons, electrical pulses of very short duration being developed between anode wires 24 and ground as slow neutrons pass through space 22. While the instrument does not produce a pulse for every neutron entering it, the frequency of the pulses generated is an accurate measure of the intensity of the slow-neutron field within space 22.

The closed space defined by the seal members 37 and the inner cylinder 27 is designed to function as a detector of gamma rays. An anode wire 26 is disposed axially and centrally of space 23 and is connected to an amplifier-power supply unit 42 operative to impress on it a high positive voltage. The cylinder 26 is maintained at electrical ground potential. The space 23 is filled with an appropriate mixture of gases such as neon and alcohol vapor.

In operation, cylinder 27 acts as cathode and central wire 26 acts as anode of a detector responsive to gamma rays. The passage of gamma rays through the space 23 cause a series of short-duration electrical pulses to appear between anode 26 and ground, said pulses being applied to and amplified by the amplifier 42. As with the neutron detector just described, the gamma-ray detector does not produce a pulse for every gamma ray, but the frequency of its output pulses does provide an accurate measure of the intensity of the gamma-ray field within space 23.

The output of amplifier 41 is applied to a conventional scaling circuit 43 designed to step down the rate of occurrence of pulses by a suitable factor, such, for example, as sixty-four. That is, scaler 43 will produce one output pulse for every sixty-four pulses fed into it by amplifier 41. Such devices are well known in the art and need not be described in detail here. A similar scaler 44 is connected to the output of amplifier 42.

The step-down ratio of scalers 43 and 44 need not be identical and different step-down ratios can be used to compensate for differences in the order of magnitude of the neutron and gamma-ray fluxes traversing the instrument.

The output current of scaler 43 is applied to the coil 44 of differential stepping switch 51, and the output current of scaler 44 is applied to the coil 45 of stepping switch 51, the armatures 46 and 47 associated with the coil 44 and 45 being arranged with respect to the toothed wheel of switch 51 in such a manner that pulses from scaler 43 tend to rotate the stepping switch in one direction while pulses from the scaler 44 tend to rotate the stepping switch in the opposite direction.

The rotatable wheel of stepping switch 51 is keyed to a shaft 51a to which is also keyed a cam 51b, the cam 51b having a raised zone which, at a predetermined angular position of the cam, will engage resilient switch member 51c and cause the switch contact carried by it to engage fixed contact 51d. The contacts of switch 51 are connected so as to make or break a series circuit comprising voltage source 52 and a load resistor 53. The junction between voltage source 52 and resistor 53 is grounded, and the other terminal of resistor 53 is connected by means of the central conductor 14a to a conventional frequency meter 61 normally located on the surface of the earth near the opening of the bore hole. Frequency meter 61, which is a well-known device, has the effect, when fed by a series of pulses, of developing a unidirectional output voltage or current the value of which at any instant is proportional to the frequency of the pulses applied.

The varying D.-C. output current of the frequency meter 61 is applied to the coil 62 of mirror-galvanometer 63. The mirror 64 of galvanometer 63 reflects light from light source 65 onto the sensitized film surface of a conventional film recorder 66, the film of which is advanced in step with the rotation of measuring wheel 25 by means of a suitable mechanical linkage 67 and a speed-reduction gear box 68. This recording arrangement is conventional is deep-well logging systems and needs no further description.

In the operation of my invention, fast neutrons having about 5 m. e. v. energy are emitted by the source 15 and penetrate the formations outside the bore hole. The fast neutrons from the source 15 are slowed down and in large part are absorbed by hydrogen nuclei in the formations. Of the neutrons which are merely slowed down, some low-energy neutrons—having energies usually well below 10 e. v.—diffuse back to the logging instrument and are detected by the neutron-detector portion of my logging instrument, the impingement of the neutrons being evidenced by generation of a train of electrical impulses at the anode wires 24.

Other neutrons from source 15 will be captured by elements in the formations surrounding the bore hole, such captures being accompanied by emission of gamma rays. Some of those gamma rays will pass through my logging instrument and actuate the gamma-ray detector embodied therein, thus producing a train of electrical impulses on the anode wire 26.

The respective pulse trains are amplified by the amplifiers 41 and 42, are scaled down in frequency in like proportion by the scalers 43 and 44, and thereupon are applied to the differential stepping switch 51, pulses from the neutron detector being operative to rotate the stepping switch in one direction and pulses from the gamma-ray detector being operative to rotate it in the other direction.

As will be seen from Fig. 1, the speed of rotation of the shaft 51a is proportional to the difference between the number of pulses per unit time derived from the neutron detector and the number of pulses per unit time derived from the gamma-ray detector. The number of closures of switch 51d, and hence the number of impulses transmitted to the surface via cable 14, is directly proportional to the rotational speed of shaft 51a, since the switch contacts 51d close when the raised zone of cam 51b turns into engagement with the spring member 51c.

It will of course be understood that cam 51b can be provided with any desired number of raised zones. Also, of course, the degree of step-down in pulse frequency accomplished by scalers 43 and 44 may be set at any desired value. Thus the range of frequency of the pulses transmitted to the surface via cable 14 may be adjusted within wide limits. The actual frequency of such pulses sent to the surface is a matter of convenience, it being changes in such frequency that are significant from the point of view of identifying the character of the formations surrounding the bore hole.

Since, in accordance with my invention, the pulse train indicating the difference in intensity of the neutron and gamma-ray fields is generated directly from the pulses derived from the radiation detectors (before conversion to D. C. by means of a frequency meter) instrument drift is wholly avoided and accurate results are obtained even if the pulses generated by switch 51 represent a small difference between two very large numbers.

In some cases it may be preferable to compare the neutron-neutron and neutron-gamma ray responses by recording their ratio, rather than their difference. For that purpose, apparatus of the sort disclosed in Figs. 4–6 may be used.

As with the apparatus just described, the alternative apparatus of Figs. 4–6 provides, throughout a well-logging operation, an output signal wherein comparison of two radiation-detector outputs is accomplished by direct comparison of the respective pulse trains, without any prior conversion to varying D. C. voltage. The apparatus of Figs. 4–6 embodies, however, a ratio comparator, rather than the difference comparator of the Fig. 1 apparatus.

The mechanical structure which might be considered the heart of the ratio comparison is shown in perspective in Fig. 4. Broadly, it consists of a disc 102 provided with a shaft 106 rigidly attached thereto. The upper surface of disc 102 is preferably covered with some slightly resilient material such as semi-hard rubber of the sort used on typewriter platens.

A cylinder 113 is mounted, by any suitable means (not shown), above disc 102, in such a position that the axis of shaft 106 intersects at right angles with the axis of cylinder 113. Cylinder 113, like disc 102, is free to rotate, and is provided with a keyed shaft 103. Cylinder 113 should preferably also have a slightly resilient surface covering, like that of disc 102.

Disposed between the disc 102 and cylinder 113, is a ball 101. The ball is carried within an aperture 114 in a rack bar 115, the aperture 114 being slightly larger than the ball, so as to permit the ball to roll freely within the aperture but restraining the ball against any appreciable lateral movement in any direction.

The rack bar 115 is held by any suitable means, such as guides 116, in such a manner that it is free to move longitudinally parallel to the axis of cylinder 113. On the under surface of bar 115 is a rack 115a, designed for cooperation with a pinion 117. Keyed to pinion 117 is a shaft 107, it being understood of course that the shaft 107 is journaled in suitable bearings (not shown) leaving pinion 117 and the shaft 107 free to rotate.

By rotation of shaft 107 pinion 117 is caused to move rack bar 115 and the position of ball 101 relative to disc 102 and cylinder 113 is thereby changed. The range of movement of ball 101 is substantially from the center of disc 102 to its outer edge.

The apparatus just described constitutes a variable-speed drive mechanism in which the ratio of the angular speeds of shafts 106 and 103 is a function of the position of ball 101 and hence of the angular position of shaft 107.

The manner in which the apparatus of Figs. 4 and 5 may be employed in conjunction with the radiation detectors of Fig. 1 is illustrated diagrammatically in Fig. 6.

Fig. 6 represents a fragmentary diagrammatic view of a logging unit of the sort illustrated in Fig. 1, except that the apparatus in Fig. 6 discloses a ratio indicator substituted for the difference indicator shown in Fig. 1 and heretofore described.

In the logging unit 213 of Fig. 6 all the apparatus of Fig. 1 below the scalers 43 and 44 may be incorporated without change, the differences between the embodiments being wholly in the comparator mechanisms. In the Fig. 6 form of the invention, the output current pulses from the scaler 43 operate a magnet coil 244 provided with a pawl 246 which cooperates with a toothed wheel 251 keyed to shaft 103 of ratio meter 222.

Ratio meter 222, while shown in Fig. 6 in block form, may be the cylinder-disc apparatus of Figs. 4 and 5, being provided, it will be recalled, with three shafts, respectively designated 103, 106, and 107. It will also be recalled that the ratio of the angular velocities of shafts 103 and 106 is determined by the angular position of shaft 107.

Shaft 106 of ratio meter 222 is connected to one input of a conventional differential gear box 223, the other input shaft of which, designated shaft 104, is keyed to a ratchet wheel 252. Ratchet wheel 252 is driven by a pawl 247 actuated by a magnet coil 245 which, in turn, is connected to the output of scaler 44 and driven by current impulses therefrom.

The output shaft 108 of differential gear box 223 is coupled by a suitable means, such as meshing gears 231 and 232, to shaft 107 of ratio meter 222.

Shaft 107 is arranged in any suitable manner to cause the movable arm 253 of a potentiometer 254 to rotate proportionally to rotation of the shaft 107. In the figure, for purposes of diagrammatic illustration, the arm 253 is shown keyed directly to the shaft 107, and electrical connection made to the contact terminal of arm 253 by means of a pigtail connector 255. It will be understood that that showing is diagrammatic, and that any one of numerous obvious mechanical arrangements may be used in practice for causing the arm 253 to move across the fixed resistance strip of potentiometer 254 as shaft 107 rotates.

Shunted across the resistance strip of potentiometer 254 I provide a suitable voltage source 256 which, in the drawing, I have diagrammatically shown as a battery. In practice, voltage source 256 may be either a D.-C. source or an A.-C. voltage source. One terminal of the potentiometer 254 is grounded, and the movable arm is connected by means of the aforementioned pigtail connector 255 to the central conductor 214a of cable 214, corresponding in structure and function to cable 14 of the Fig. 1 device.

In operation, the shafts 103 and 104 will rotate at speeds respectively proportional to the frequencies of the current impulses from scalers 43 and 44. Assume that the ratio $$\frac{\text{R.P.M.}_{103}}{\text{R.P.M.}_{104}} = n$$

If the position of ball 101 in the ratio meter 222 is such that shafts 103 and 106 are also turning with speeds having the ratio $n$, then shafts 106 and 104 will be turning at the same speed and the output shaft 108 of differential gear box 223 will be stationary.

If the driving ratio of apparatus 222 is not equal to $n$, however, then shaft 106 will turn at a different speed from that of shaft 104, and shaft 108 will thereupon rotate. The resulting rotation of shaft 107 will cause the ball 101 to assume a different position, rotation of shaft 107 continuing only until the drive ratio of apparatus 222 has become equal to the ratio of speeds of the two shafts 103 and 104.

As the shaft 107 turns, the position of contact arm 253 on potentiometer 254 will likewise shift, and the magnitude of the output voltage transmitted to the surface via conductor 214a will change in accordance with changes in the position of shaft 107, so that, by appropriate apparatus, a log can be made at the surface which will continuously record the angular position of shaft 107 and hence the frequency ratio of the output pulse trains from scalers 43 and 44.

The embodiments of my invention which have been described in considerable detail in this specification can be employed in connection with a variety of logging methods. The particular structural arrangement shown, wherein neutron and gamma-ray detectors are coaxially mounted, is especially well adapted for some applications. In other applications, on the other hand, it may be desirable to use spaced-apart radiation detectors. Similarly, in some applications it may be desirable to employ my invention for deriving an output signal which represents a comparison of the response of two detectors of the same type of radiation, such as two gamma-ray detectors or two neutron detectors.

Furthermore, the particular logging method with which my apparatus is to be used will affect the arrangement and characteristics of the shielding. When the apparatus is to be used for practicing the combined neutron-neutron and neutron-gamma ray logging method, the shield 20 will normally be designed to attenuate soft gamma rays and to favor gamma rays of energies in the neighborhood of 7 m. e. v. in the same application of the instrument, it may be desirable to place shield 20 externally of the housing, beyond the normal cylindrical contour thereof, in order that the shield may displace as much as possible of the drilling fluid normally found in bore holes. Such displacement is desirable because the drilling fluid has a great affinity for slow neutrons and, on absorbing such neutrons, will frequently emit gamma rays of capture having energies of the same order of magnitude as the rays being studied.

While in this specification I have described quite extensively certain embodiments of my invention, it should be understood that that description is illustrative only. Many variations and departures from the structure shown may be made by persons skilled in the art without departing from the spirit of my invention.

I claim:

1. A radiation detector comprising a first radiation sensing unit operative to produce a first train of electrical impulses responsively to the presence of a first radiation field, the frequency of such impulses being substantially proportional to the intensity of said radiation field, a second radiation sensing unit operative to produce a second train of electrical impulses responsively to the presence of a second radiation field, the frequency of such other impulses being substantially proportional to the intensity of said second field, and signal-generating means fed by said two trains of impulses operative to produce an output pulse train having a repetition rate proportional to the difference in frequency between said first and second impulse trains.

2. A radiation detector comprising a first radiation sensing unit operative to produce a first train of electrical impulses responsively to the presence of a first radiation field, the frequency of such impulses being substantially proportional to the intensity of said radiation field, a second radiation sensing unit operative to produce a second train of electrical impulses responsively to the presence of a second radiation field, the frequency of such other impulses being substantially proportional to the intensity of said second field, and signal-generating means fed by said two trains of impulses and comprising a storage element, said storage element being operative to store signals corresponding to the respective impulses in said trains, to compare such signals as to frequency, and to produce an output impulse train having a repetition rate proportional to the difference between the respective frequencies of said first and second impulse trains.

3. In a sub-surface logging unit for use in bore holes, the combination of two separate radiation detectors and a mixer means, said detectors respectively feeding trains of energy impulses to said mixer means, and signal-generating means associated with said mixer means, said mixer means and said signal-generating means being operative in conjunction to produce an output pulse train having a repetition rate varying in substantial accordance with the difference between the frequencies of said respective impulse trains.

4. Apparatus according to claim 1 wherein said signal-generating means comprises comparing means fed by said first and second impulse trains having a characteristic which changes in one sense by a fixed increment responsively to each impulse of said first train and changes by the same increment in the opposite sense responsively to each impulse of said second train, said comparing means being operative to control the repetition rate of said output signal.

5. Apparatus according to claim 1 wherein said signal-generating means comprises an element having a characteristic which changes in one sense by finite and predetermined increments in response to impulses in said first train and which changes in the opposite sense by finite and predetermined increments in response to impulses of said second train.

References Cited in the file of this patent

UNITED STATES PATENTS

| | | |
|---|---|---|
| 2,440,167 | Broxon et al. | Apr. 20, 1948 |
| 2,443,731 | Herzog et al. | June 22, 1948 |
| 2,445,305 | Hochgesong | July 13, 1948 |
| 2,508,772 | Pontecorvo | May 23, 1950 |
| 2,543,676 | Thayer et al. | Feb. 27, 1951 |
| 2,745,970 | Dewan | May 15, 1956 |